Figure 3:
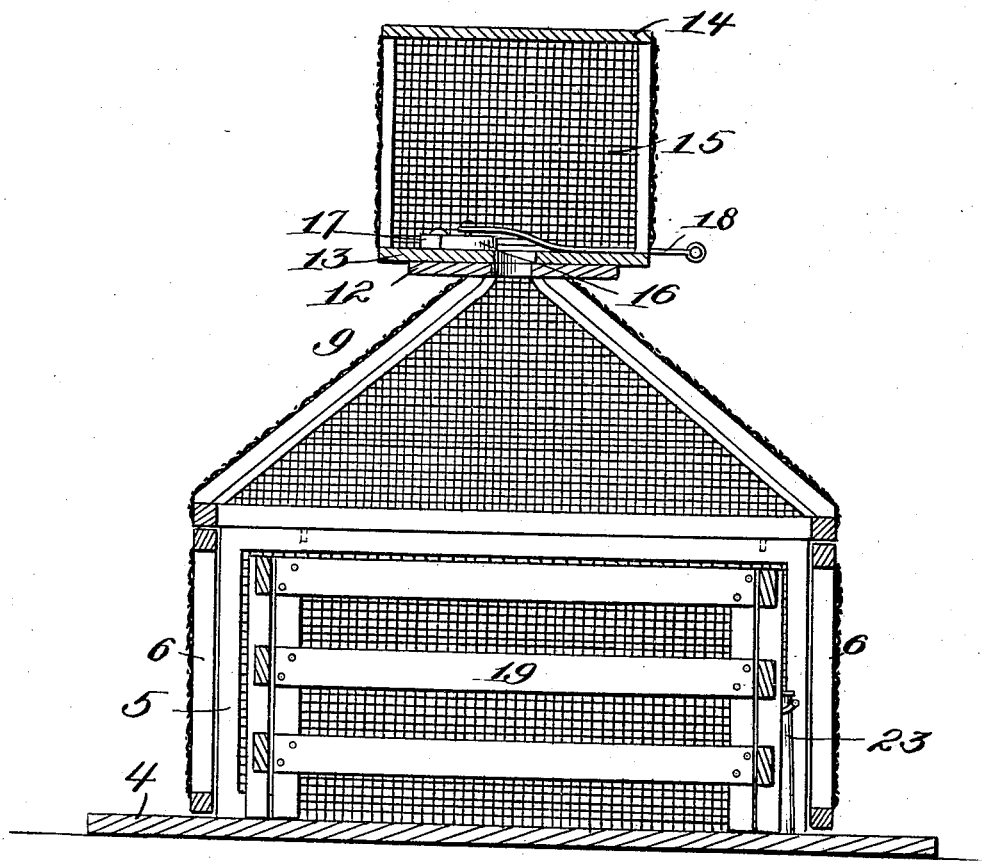

No. 870,360. PATENTED NOV. 5, 1907.
W. H. HARBUCK.
FLY TRAP SHED.
APPLICATION FILED JULY 29, 1907.
2 SHEETS—SHEET 1.
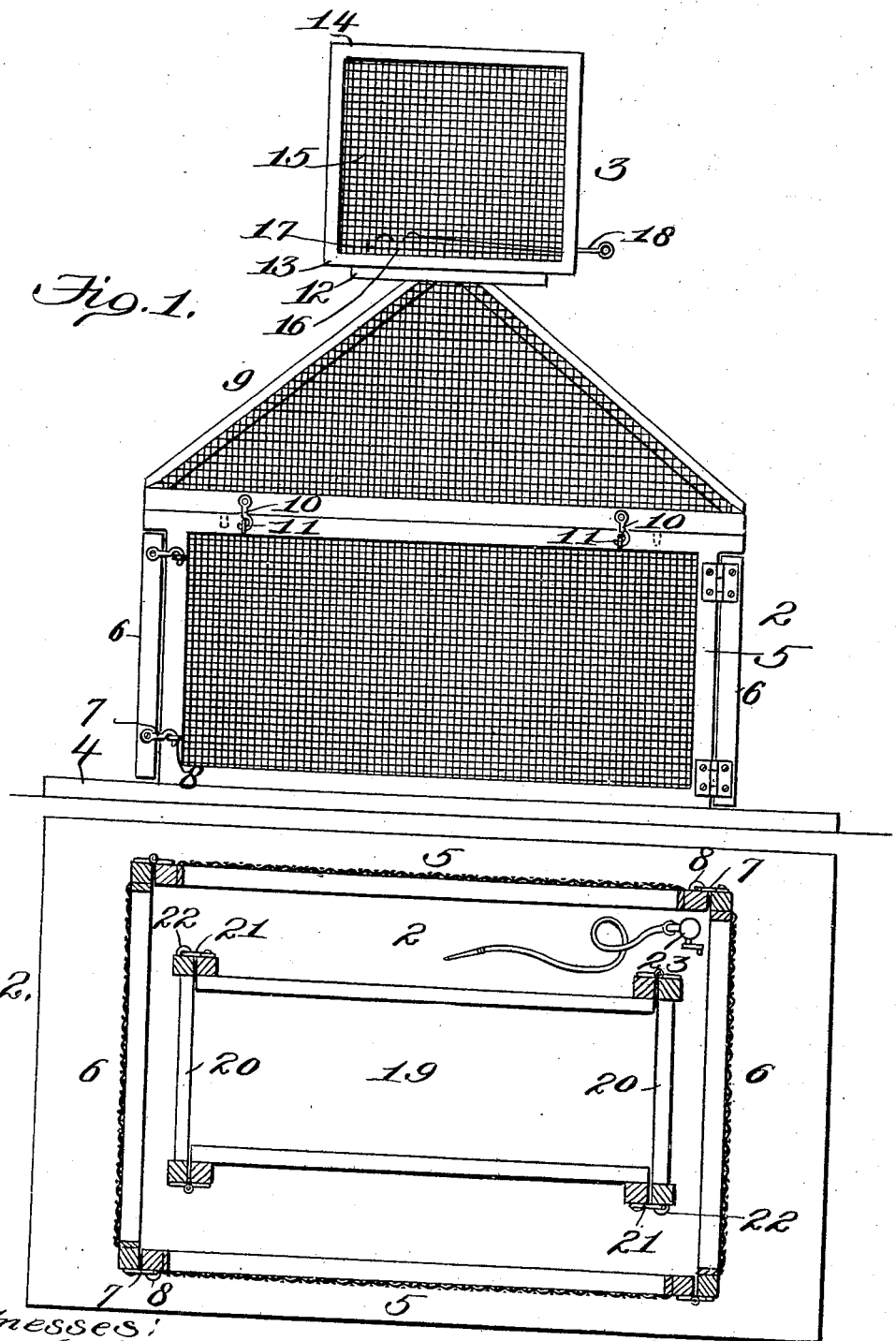

No. 870,360.

PATENTED NOV. 5, 1907.

W. H. HARBUCK.
FLY TRAP SHED.
APPLICATION FILED JULY 29, 1907.

2 SHEETS—SHEET 2.

Witnesses:
C. D. Kesler
W. B. Keefer

Inventor
William H. Harbuck
By
James L. Norris
atty.

UNITED STATES PATENT OFFICE.

WILLIAM H. HARBUCK, OF ANDERSON, TEXAS.

FLY-TRAP SHED.

No. 870,360.   Specification of Letters Patent.   Patented Nov. 5, 1907.

Application filed July 29, 1907. Serial No. 386,114.

*To all whom it may concern:*

Be it known that I, WILLIAM H. HARBUCK, a citizen of the United States, residing at Anderson, in the county of Grimes and State of Texas, have invented new and useful Improvements in Fly-Trap Sheds, of which the following is a specification.

This invention relates to what I shall for convenience designate a fly-trap shed, the object of the invention being to provide a simple article of this character which can be inexpensively made and which can be readily and quickly set up or knocked down, the device being preferably of collapsible character whereby, when not in use, it may be knocked down and stored away to occupy but a small space.

The device comprises, as will be implied from its title, a shed or house into which cows or other animals may be driven, and a trap to receive the flies removed from such cows while in said shed. The flies can be removed from the cows by a simple water spray and this latter drowns a large number of such insects. Those which are not drowned will enter the trap and they can be destroyed by the use of a sulfur candle or something of equivalent nature. In fact, the flies in the trap may be killed in any desirable way.

In the drawings accompanying and forming a part of this specification I have shown in detail one form of embodiment of the invention which, to enable those skilled in the art to practice the same, will be set forth in detail in the following description, while the novelty of the invention will be included in the claims succeeding said description.

Referring to said drawings: Figure 1 is a side elevation of a fly-trap shed involving my invention. Fig. 2 is a horizontal sectional view of said fly-trap shed.
Fig. 3 is a longitudinal sectional view of the same.

Like characters refer to like parts throughout the several figures of the drawings.

The device covered in the present case involves in its make-up a shed such as that denoted in a general way by 2, and a trap such as that denoted in a general way by 3, the trap being, as will be hereinafter more fully set forth, removably supported by the shed 2. The shed includes in its make-up a floor or platform as 4. The body of the shed is preferably composed of two sides as 5 and two ends as 6 of duplicate construction respectively, each of said parts consisting of a frame of metal or other suitable material covered by reticulated material which may be either wire gauze or mosquito netting. Each side 5 is hinged at one end thereof to an end 6, while the other end thereof is separably connected with the opposite end 6 by hooks as 7 flexibly connected with the respective ends 6 and adapted to engage eyes as 8 on the sides 5. By disengaging the hooks 7 from the eyes 8 the ends 6 can be swung open acting in this respect as gates to permit a cow to enter the shed 2 and another cow to leave the same should there be a cow already in the shed. The roof of the shed is designated by 9 and it is separably fitted to the shed body. When the parts of the shed are assembled in operative relation the roof 9 rests on the upper edges of the sides 5 and ends 6 so as to provide an inclosed structure, and to hold the roof in place during this time it may be equipped with hooks as 10 to engage eyes as 11 on the sides 5. By disengaging the hooks 10 from the eyes 11 the roof 9 can be dismounted, after which the body of the shed can be collapsed by disengaging the hooks 7 from the eyes 8, provided, of course, said body be separated from the floor or platform 4. The sides 5 are preferably detachably connected with said floor or platform and for this purpose screws or equivalent devices may be employed.

While the roof 9 may be of any desirable shape or construction I find that a substantially pyramidal shape as illustrated is quite satisfactory, and said roof is generally made up of a frame of metal or other desirable material covered with some reticulated material which, as in the case of the body, may be wire gauze or mosquito netting. When the roof of the shed is on the body thereof there is provided a knock-down structure comprising a framing covered with foraminous or perforated material whereby ventilation is assured and whereby the scattering or escape of the flies dislodged from the cows in the shed is prevented, it being understood that, when a cow or other animal is in the shed for the purpose of being relieved of flies and other insects, the ends or doors 6 are shut.

At the top or apex of the roof 9 is a crown-piece or horizontal flange 12 on which the trap 3 is supported, and this crown-piece or flange is centrally perforated for the passage of flies into the trap.

The trap in the present case has a bottom as 13, a top as 14, and a reticulated body as 15. The bottom and top may be of metal or wood and the reticulated body 15 may be of wire gauze or mosquito netting. When the apparatus is organized for use the bottom or base 13 of the fly-trap 3 rests on the crown-piece or flange 12, a perforation in said bottom or base 13 being at this time in register with the perforation in said crown-piece or flange so as to provide for the passage of flies from the shed 2 into the trap 3, which flies may have been dislodged from a cow occupying the shed, by a water spray or in any other desirable way. The fly-trap is provided with a valve or flap controlling the opening in the bottom 13 thereof and this valve or flap may consist of a disk as 16 provided with a shank as 17 pivoted to the upper side of said bottom 13. To the valve or flap 16 I have shown connected a rod 18 whereby said valve or flap may be operated exteriorly of the trap, the rod 18 for this purpose extending through an opening in the reticulated or perforated body 15. By moving the rod 18 in an endwise direction the valve or flap 16 may be opened or closed.

During the operation of the device the valve or flap 16 is open at which time it uncovers the perforation or hole in the bottom 13. When a desired number of flies have been collected in said trap the valve will be closed or caused to cover the opening in said bottom 13 at which time the trap will be dismounted and, if desired, it may be covered with some suitable fabric, after which a lighted sulfur candle can be introduced thereinto to wholly destroy the insects therein, or, if desired, the trap with the flies may be wholly immersed in water.

Within the shed and suitably detachably connected with the platform or floor 4 thereof is a stall as 19 into which the animals are successively driven and during the presence of an animal in the stall, prevents such animal from kicking out the reticulated portions of the sides 5 or ends 6. The stall 19 has end gates as 20 which can be latched shut by suitable latches as 21 engaging suitable keepers as 22 on the sides of the stall. The stall may be made of any suitable material, for example, of heavy netting, light metal, or wood. Within the shed 2 is a hydrant as 23 which may be connected with a suitable source of water supply exterior of the shed and to which interiorly of the shed may be connected a hose or the like for the purpose of spraying the animal in the shed.

The mode of operation of the device is as follows; assuming that the parts are assembled as shown in the drawings. One of the ends or gates 6 is swung open and an adjacent gate 20 of the stall 19 is also opened so as to permit driving an animal into said stall. After the animal is in the stall the gate and end which were opened can be shut and fastened in such condition. A person can occupy the interior of the shed and he can connect the hose with the hydrant 23, after which water will be supplied to said hydrant for delivery into the hose connected therewith, and this hose can be used for spraying or directing a stream of water onto the animal in the stall to dislodge the flies therefrom. A large number of these flies are drowned by the water. Those that are not drowned will attempt to escape and will ascend up into the trap 3, the valve or flap 16 of which is open. After the flies have been thoroughly removed from the animal it will be removed and a second animal will be introduced into the shed and the operation repeated with it.

The length or width of the shed and the dimensions of the other parts may be as desired. In fact, the stall 19 may be made of such a length as to accommodate at one time several animals, or said stall, if desired, need not be used. Its presence, however, is preferable in that it prevents the animal in the shed from injuring the same in the manner hereinbefore pointed out. If desired, I need not use the hydrant but can direct the necessary washing water on to an animal by a hose the stream from which can be passed through the perforations in the reticulated portions of the sides 5 or ends 6.

The device can be employed with utility for removing insects of all kinds from different kinds of animals, although it is of particular advantage when employed for separating horn flies from cows, this being a pest which causes an unusual amount of injury to animals of such kind.

What I claim is:

1. In a device of the class described, a shed comprising a body and a roof supported by the body, the body being composed of sides and ends, each side being hinged to an end to permit the latter to constitute gates, means for fastening the ends to the respective sides, means for separably connecting the roof with the body, said roof having an opening in its top, a trap supported by the top of the roof, also having an opening therein to register with the other opening, and a valve connected with the said trap for controlling said opening.

2. In a device of the class described, a shed comprising a body and a roof supported by the body, the body being composed of sides and ends, each side being hinged to an end to permit the latter to constitute gates, means for fastening the ends to the respective sides, means for separably connecting the roof with the body, said roof having an opening in its top, a trap supported by the top of the roof, also having an opening therein to register with the other opening, a valve connected with the said trap for controlling said opening, and a rod connected with the valve and extending to a point exteriorly of the trap, for operating said valve.

3. In a device of the class described, a shed comprising a body and a roof separably connected with each other, the body being composed of sides and ends, each of said sides being hinged to an end, means for fastening the ends to the respective sides, a crown-piece on the roof, having an opening communicating with the interior of the shed, a stall extending longitudinally of the shed and having swinging gates at its opposite ends, combined with a trap supported by said crown-piece, the trap having an opening in its bottom to register with said other opening, a valve pivoted to said bottom for controlling the opening therein, and a rod connected with the valve and extending exteriorly of the trap to permit the operation of the valve from a point outside said trap.

In testimony whereof I have hereunto set my hand in presence of two subscribing witnesses.

WM. H. HARBUCK.

Witnesses:
SIDNEY W. HATCHER,
J. L. HARRISON, Jr.